Dec. 6, 1949
D. B. COX
2,490,728
SELF-LOCKING NUT
Filed June 22, 1945
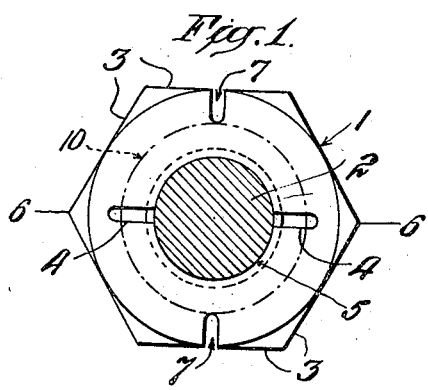
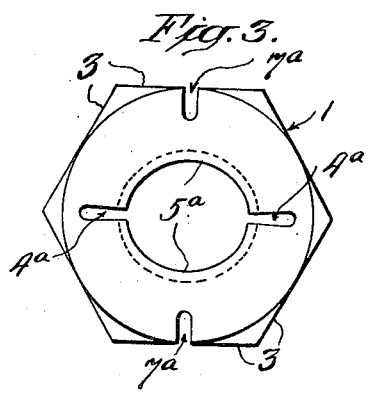
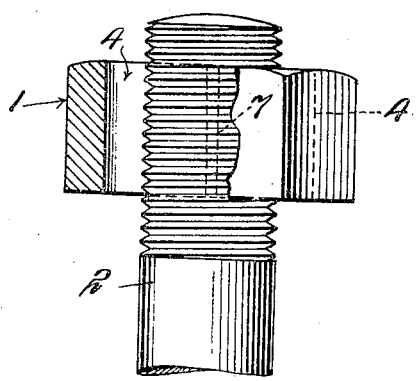
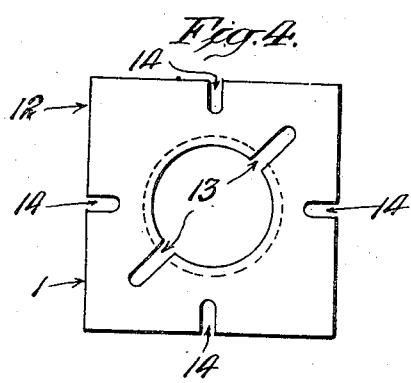
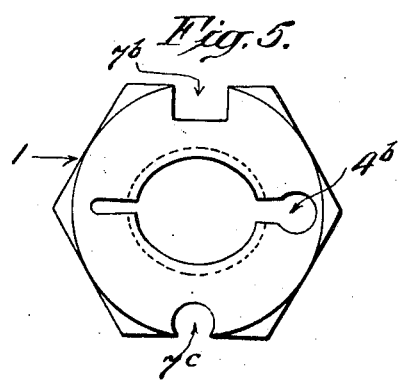
INVENTOR
DUNCAN B. COX
BY
Watson, Bristol, Johnson & Leavenworth
ATTORNEY Patented Dec. 6, 1949

2,490,728

UNITED STATES PATENT OFFICE 2,490,728

SELF-LOCKING NUT

Duncan B. Cox, Woodbury, N. Y.

Application June 22, 1945, Serial No. 600,921

4 Claims. (Cl. 151—21)

The invention relates to improvements in bolt nuts which are self-locking without the aid of auxiliary devices or manipulations. The nut is of economical design consisting of a single piece of a uniform single material adapted flexibly to grasp the bolt. Various types of self-locking nuts adapted flexibly to engage the bolt throughout various portions of the nut have heretofore been proposed and in one or more cases have been fairly successful when the parts are carefully made and held to close tolerances. The range of flexibility, however, of such previous designs is limited and they are not well suited to low-grade bolts where the dimensions are subject to rather large variations.

The present invention provides a nut having a capacity for considerable distortion from the relaxed condition and capable of frictionally engaging the bolt to provide ample locking characteristics even though the bolts vary a substantial amount over and under the particular standard size. This degree of flexibility is achieved without substantial sacrifice of thread area and without excessively reducing the cross-sectional area at any radial plane whereby adequate strength is preserved. In general, increased radial flexibility is obtained without more than a minor decrease in the normal axial strength.

The nut itself may be manufactured by relatively inexpensive rapid production methods, and, because of its flexibility does not require an expensive high-grade bolt.

Other objects of the invention will in part be obvious and will in part appear hereinafter.

The invention accordingly comprises an article of manufacture possessing the features, properties, and the relation of elements which will be exemplified in the article hereinafter described, and the scope of which invention will be indicated in the claims.

For a fuller understanding of the nature and objects of the invention reference should be had to the following detailed description taken in connection with the accompanying drawing, in which:

Fig. 1 is a plan view of a hexagonal nut, embodying the principles of the invention, applied to a bolt;

Fig. 2 is an elevation of the nut and bolt shown in Fig. 1, with a portion of the nut broken away;

Fig. 3 is a view similar to that of Fig. 1, showing a nut similar to that of Fig. 1 but being formed to provide a somewhat elliptical threaded opening;

Fig. 4 is a plan view of a nut having the standard square wrench receiving outline, embodying the principles of the invention; and Fig. 5 is a plan view of a nut showing variations in the shape of the slot applied thereto.

Referring particularly to Figs. 1 and 2, there is shown a nut 1 of conventional contour applied to a bolt 2. The bolt 2 may be of any standard design with standard threads and of any selected size.

The nut 1 will be suitably contoured and shaped to receive a standard or special wrench and, as shown, has the conventional hexagonal shape, provided with the flat wrench surfaces 3. The flexible characteristics are achieved through the provision of both internal and external radial slots which may be varied in shape as well as in number and location to suit the particular nut. In the hexagonal nut shown, a pair of slots 4 extend radially outwardly from the central threaded opening 5. The slots 4 are preferably arranged to be radially in line with the apices 6 between two respectively adjoining flat surfaces 3. By so locating the slots 4, they may be made of considerable depth without reducing excessively the cross-sectional area of the nut.

A pair of radial slots 7 are also provided extending inwardly from the central portions of the flat peripheral surfaces 3, the slots 7 being so located as to be in a plane at right angles to the slots 4.

The slots 7, similarly to slots 4, are limited as to depth so as to preserve ample cross-sectional area and correspondingly the strength. The depths of the slots 4 and 7 may be varied a reasonable amount dependent upon the circumstances and the proportions of the particular nut. From the standpoint of achieving the maximum range of flexibility, the slots should be of a depth such that the outer ends of the slots 4 are at a radial distance from the center of the nut equal at least to the radial distance of the bottom of the slots 7. Such a relation is demonstrated by the circle 10 in Fig. 1. It will be seen that this circle which is of uniform radius about the center of the nut is tangent to the bottoms of the slots 7 and intersects the slots 4. The relation is achieved in Fig. 1 by having the slots extend for one-half the radial thickness of the nut at the respective radial planes, although the external slots may be made of less depth than that shown and still obtain the desired relation. The exact shape and width of the slots can be varied widely within the scope of my invention, although it is desirable that the inner ends of the slots 4 be not so wide as to sacrifice materially the shearing strength of the threads nor so narrow as to be difficult to manufacture or to restrict unduly the desired flexibility. The limitations on the width of the outer slots 5 are that they be not too large as to interfere with the reasonable life for the wrenching surfaces nor tool small as to limit flexibility. A slot width of between 5% and 30% of the thread diameter is considered reasonable. Fig. 5 illustrates at 7b and 7c two variations in the shape of the outer slot which may be employed and shows at 4b one of the many practical alternate shapes for the interior slots.

The flexible gripping of the bolt may be effected by the further provision of either one of two means. The nut may be manufactured with a threaded hole a few thousandths of an inch under size, or preferably it may be made initially of approximately standard size, or of slightly larger size, and then be deformed by pressure so that in normal relaxed condition the threaded opening is either slightly elliptical or otherwise reduced in minimum diameter to provide a slight interference fit on the bolt. The deformation by pressure should preferably be accomplished in such a manner that in a relaxed position the major diameter is on line with the interior slots, since this relationship will provide a maximum of flexibility for locking. This latter means is illustrated in somewhat exaggerated form in Fig. 3, in which the vertical axis, in the plane of the paper, of the threaded opening 5a is less than the axis at right angles thereto. Such method of deforming the nut tends to draw together the opposed faces of the slots 4a and 7a at the respective open ends. It will be seen that with the respective slots disposed in pairs and the inner and outer slots alternately located, an arrangement is provided which affords a substantial range of elastic expansion and contraction so that firm gripping of the bolt threads is assured even though the diameters of the different bolt threads may vary considerably one from another. At the same time, sufficient metal remains throughout the peripheral extent of the nut to provide the necessary strength.

Because of the type and simplicity of the shape of the nut it may be economically made as, for example, by extruding an aluminum alloy through a die which will provide the general peripheral outline, hole in the center, and interior and exterior slots, thus leaving only the machining operations of cutting off and threading the blanks. The shape of the slots can, of course, be of any character adapted to the extrusion operation.

Figs. 1 to 3 depict a hexagonally shaped nut in accordance with the most common arrangement and one to which the invention is particularly adapted. As heretofore noted, however, the principles of the invention may be advantageously incorporated in nuts of other fundamental shapes, of which the standard square nut 12 of Fig. 4 is illustrative. Such a nut may be provided with one or more pairs of internal slots 13, one pair being shown; and one or more pairs of external slots 14. Each of the slots extends for approximately one-half the radial thickness of the metal at the respective plane, and the alternate slots may radially overlap if a maximum of flexibility is desired.

Since certain changes may be made in the article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A self-locking nut having a peripheral surface shaped to receive an appropriate wrench and an internally threaded axial opening, said nut being provided with a pair of slots extending radially outwardly from the threaded opening and a pair of slots extending radially inwardly from the peripheral surface alternately arranged with respect to said outwardly extending slots and each spaced peripherally therefrom and from each other, the depth of all of said slots being limited such that the radial cross-sectional area at any such slot is not reduced to less than one-half of the otherwise minimum radial cross-sectional area of the nut but said nut and its slots being proportional and arranged to permit substantial radial expansion of the axial opening, the threaded internal surface of the latter being adapted to compress against and flexibly engage the threads of the bolt upon which the nut is designed to be used.

2. A self-locking nut provided with a hexagonal peripheral surface shaped to receive an appropriate wrench and an internally threaded axial opening having two internal slots radially extending in the direction of two opposite corners of the wrenching surface, and also having two external slots extending into the opposite flats of said wrenching surface at right angles to said internal slots, said nut in a relaxed condition being deformed to render said axial opening out of round and undersize on a diameter transverse to said internal slots and adapted thereby flexibly to engage and compress against the bolt upon which the nut is designed to be used.

3. A nut having a series of flat surfaces on its periphery successively arranged at an angle to receive a wrench and an internally threaded axial hole, said nut being provided with a pair of diametrically opposed slots extending outwardly from said hole each radially in line with the apex formed by an adjoining pair of said flat surfaces and a pair of slots each extending radially inwardly from the intermediate portion of one of said flat surfaces and alternately arranged with respect to said outwardly extending slots, all of said slots being of limited depth to preserve a substantial radial thickness of material throughout the peripheral extent of the nut but said nut and its slots being proportioned and arranged to permit substantial radial expansion of the axial hole and the threaded internal surface of the latter being adapted to compress against and flexibly engage the threads of the bolt upon which the nut is designed to be used.

4. A nut having a series of flat surfaces on its periphery successively arranged at an angle to receive a wrench and an internally threaded axial hole, said nut being provided with a pair of diametrically opposed slots extending outwardly from said hole each radially in line with the apex formed by an adjoining pair of said flat surfaces and a pair of slots each extending radially inwardly from the intermediate portion of one of said flat surfaces and alternately arranged with respect to said outwardly extending slots, all of said slots being of limited depth to preserve a substantial radial thickness of material throughout the peripheral extent of the nut but extending sufficiently far that a circle drawn concentrically with said hole and of a radius to touch the bottoms of the outwardly extending slots will be intersected at least by the inwardly extending slots, the arrangement of said hole and the respective portions of the nut being such as to permit a substantial amount of radial expansion of the hole and the threaded internal surface thereof being adapted to compress against and flexibly engage the threads of the bolt upon which the nut is designed to be used.

DUNCAN B. COX.

REFERENCES CITED

The following references are of record in the file of this patent:

UNITED STATES PATENTS

| Number | Name | Date |
| --- | --- | --- |
| 332,540 | Law | Dec. 15, 1885 |
| 337,801 | Vaughn | Mar. 9, 1886 |
| 1,092,256 | Glanber | Apr. 7, 1914 |
| 1,750,925 | Dieter | Mar. 18, 1930 |
| 2,007,293 | Cayouette | July 9, 1935 |
| 2,125,276 | Green | Aug. 2, 1938 |
| 2,255,286 | Harvey | Sept. 9, 1941 |
| 2,279,388 | Cox | Apr. 14, 1942 |
| 2,410,995 | Olson | Nov. 12, 1946 |

FOREIGN PATENTS

| Number | Country | Date |
| --- | --- | --- |
| 64,486 | Sweden | Jan. 24, 1928 |
| 17,400 | Great Britain | July 26, 1912 |